United States Patent
Chen et al.

(10) Patent No.: US 11,775,822 B2
(45) Date of Patent: Oct. 3, 2023

(54) CLASSIFICATION MODEL TRAINING USING DIVERSE TRAINING SOURCE AND INFERENCE ENGINE USING SAME

(71) Applicant: MACRONIX INTERNATIONAL CO., LTD., Hsinchu (TW)

(72) Inventors: Shih-Hung Chen, Jhudong (TW); Tzu-Hsiang Su, Hsinchu (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 598 days.

(21) Appl. No.: 16/885,638

(22) Filed: May 28, 2020

(65) Prior Publication Data
US 2021/0374519 A1 Dec. 2, 2021

(51) Int. Cl.
G06N 3/08 (2023.01)
G06N 3/04 (2023.01)

(52) U.S. Cl.
CPC ............... G06N 3/08 (2013.01); G06N 3/04 (2013.01)

(58) Field of Classification Search
None
See application file for complete search history.

(56) References Cited

U.S. PATENT DOCUMENTS

| | | | |
|---|---|---|---|
| 7,593,908 B2 | 9/2009 | Abdulkader et al. | |
| 10,540,591 B2 | 1/2020 | Gao et al. | |
| 10,552,759 B2 | 2/2020 | Rich | |
| 10,650,929 B1* | 5/2020 | Beck | G06F 16/55 |
| 11,182,691 B1* | 11/2021 | Zhang | G06N 20/00 |
| 2015/0170001 A1 | 6/2015 | Rabinovich et al. | |
| 2015/0242747 A1* | 8/2015 | Packes | G06N 3/0454 706/17 |
| 2017/0300811 A1* | 10/2017 | Merhav | G06N 3/084 |
| 2019/0007433 A1* | 1/2019 | McLane | H04L 9/0643 |
| 2019/0073564 A1 | 3/2019 | Saliou | |

(Continued)

FOREIGN PATENT DOCUMENTS

| | | | |
|---|---|---|---|
| CN | 106815515 A | 6/2017 | |
| CN | 107368892 A | 11/2017 | |

(Continued)

OTHER PUBLICATIONS

Beasley, "Manufacturing Defects," may be found at https://slideplayer.com/slide/11407304, downloaded May 20, 2020, 61 pages.

(Continued)

*Primary Examiner* — Aaron M Richer
(74) *Attorney, Agent, or Firm* — Korbin S Van Dyke; Haynes Beffel & Wolfeld LLP

(57) ABSTRACT

A method for generating a classification model using a training data set. An iterative procedure for training an ANN model, in which an iteration includes selecting a small sample of training data from a source of training data, training the model using the sample, using the model in inference mode over a larger sample of the training data, and reviewing the results of the inferencing. The results can be evaluated to determine whether the model is satisfactory, and if it does not meet specified criteria, then cycles of sampling, training, inferencing and reviewing results (STIR cycles) are repeated in an iterative process until the criteria are met. A classification engine trained as described herein is provided.

27 Claims, 12 Drawing Sheets

(56) References Cited

U.S. PATENT DOCUMENTS

| | | | |
|---|---|---|---|
| 2019/0073565 A1 | 3/2019 | Saliou | |
| 2020/0027207 A1* | 1/2020 | Zhang | G06K 9/6247 |
| 2020/0089130 A1* | 3/2020 | Chao | H01L 22/12 |
| 2020/0143248 A1 | 5/2020 | Liu et al. | |
| 2022/0215541 A1* | 7/2022 | Paul | A61B 6/507 |

FOREIGN PATENT DOCUMENTS

| | | | | |
|---|---|---|---|---|
| CN | 110598752 A | | 12/2019 | |
| KR | 20200045023 A | * | 5/2020 | G06V 20/63 |
| TW | 202011285 A | | 3/2020 | |
| WO | 2016/084336 A1 | | 6/2016 | |

OTHER PUBLICATIONS

Entegris FAQ Series, "Contamination Control in Ultrapure Chemicals and Water: Fundamentals of Contamination Control," may be found at https://www.entegris.com/en/home/resources/technical-information/faq/contamination-control-in-ultrapure-chemicals-and-water.html., downloaded May 20, 2020, 10 pages.

IMEC Magazine, Mar. 2018, 35 pages.

Kim, "Abrasive for Chemical Mechanical Polishing. Abrasive Technology: Characteristics and Applications," Book Abrasive Technology: Characteristics and Applications, Mar. 2018, 20 pages.

Minghao Qi, "ECE 695Q Lecture 10: Optical Lithography—Resolution Enhancement Techniques," may be found at https://nanohub.org/resources/15325/watch?resid=24507, Spring 2016, 35 pages.

The Nikon eReview, "KLA-Tencor Research Scientist Emphasizes Stochastic Challenges at LithoVision 2018," may be found at https://nikonereview.com/2018/kla-tencor-research-scientist-emphasizes-stochastic-challenges-at-lithovision—Spring 2018, 7 pages.

* cited by examiner

FIG. 9

CLASSIFICATION MODEL TRAINING USING DIVERSE TRAINING SOURCE AND INFERENCE ENGINE USING SAME

BACKGROUND

Field

The present invention relates to training classification engines including neural networks and particularly as applied to training data having a plurality of categories of objects with uneven distributions.

Description of Related Art

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep neural networks are a type of artificial neural networks (ANNs) that use multiple nonlinear and complex transforming layers to successively model high-level features. Deep neural networks provide feedback via backpropagation which carries the difference between observed and predicted output to adjust parameters. Deep neural networks have evolved with the availability of large training datasets, the power of parallel and distributed computing, and sophisticated training algorithms. Deep neural networks have facilitated major advances in numerous domains such as computer vision, speech recognition, and natural language processing.

Convolutional neural networks (CNNs) and recurrent neural networks (RNNs) can be configured as deep neural networks. Convolutional neural networks have succeeded particularly in image recognition with an architecture that comprises convolution layers, nonlinear layers, and pooling layers. Recurrent neural networks are designed to utilize sequential information of input data with cyclic connections among building blocks like perceptrons, long short-term memory units, and gated recurrent units. In addition, many other emergent deep neural networks have been proposed for limited contexts, such as deep spatio-temporal neural networks, multi-dimensional recurrent neural networks, and convolutional auto-encoders.

The goal of training deep neural networks is optimization of the weight parameters in each layer, which gradually combines simpler features into complex features so that the most suitable hierarchical representations can be learned from data. A single cycle of the optimization process is organized as follows. First, given a training dataset, the forward pass sequentially computes the output in each layer and propagates the function signals forward through the network. In the final output layer, an objective loss function measures error between the inferenced outputs and the given labels. To minimize the training error, the backward pass uses the chain rule to backpropagate error signals and compute gradients with respect to all weights throughout the neural network. Finally, the weight parameters are updated using optimization algorithms based on stochastic gradient descent. Whereas batch gradient descent performs parameter updates for each complete dataset, stochastic gradient descent provides stochastic approximations by performing the updates for each small set of data examples. Several optimization algorithms stem from stochastic gradient descent. For example, the Adagrad and Adam training algorithms perform stochastic gradient descent while adaptively modifying learning rates based on update frequency and moments of the gradients for each parameter, respectively.

In machine learning, classification engines including ANNs are trained using a database of objects labeled according to a plurality of categories to be recognized by the classification engines. In some databases, the numbers of objects per category can vary widely across the different categories to be recognized. This uneven distribution of objects across the categories can create imbalances in the learning algorithms, resulting in poor performance in recognizing objects in some categories. One way to address this problem is to use larger and larger training sets, so that the imbalances level out or so that a sufficient number of objects in rare categories are included. This results in huge training sets, that require large amounts of computing resources to apply in training of the classification engines.

It is desirable to provide a technology to improve training of classification engines using databases of labeled objects of reasonable size.

SUMMARY

A computer implemented method is described that improves the computer implemented technology used to train classification engines including artificial neural networks.

The technologies described herein can be deployed, according to one example, to improve manufacturing of integrated circuits by detecting and classifying defects in integrated circuit assemblies in a fabrication process.

The technology roughly summarized includes an iterative procedure for training an ANN model or other classification engine model using a source of training data, where the source of training data can include objects, such as images, audio data, text and other types of information, alone and in various combinations, which can be classified using a large number of categories with an uneven distribution. The iteration includes selecting a small sample of training data from a source of training data, training the model using the sample, using the model in inference mode over a larger sample of the training data, and reviewing the results of the inferencing. The results can be evaluated to determine whether the model is satisfactory, and if it does not meet specified criteria, then cycles of sampling, training, inferencing and reviewing results (STIR cycles) are repeated in an iterative process until the criteria are met.

The technologies described herein enable training complex classification engines using smaller training data sources, enabling efficient use of computing resources while overcoming possible instabilities that arise from relying on small training data sources.

Other aspects and advantages of the technology described can be seen on review of the drawings, the detailed description and the claims, which follow.

BRIEF DESCRIPTION OF THE DRAWINGS

FIG. 9 is an image of a graphical user interface of a computer system executed by a system configured to execute a training procedure as described herein at an initial stage.

DETAILED DESCRIPTION

A detailed description of embodiments of the present technology is provided with reference to the FIGS. 1-11.

Figure 1:
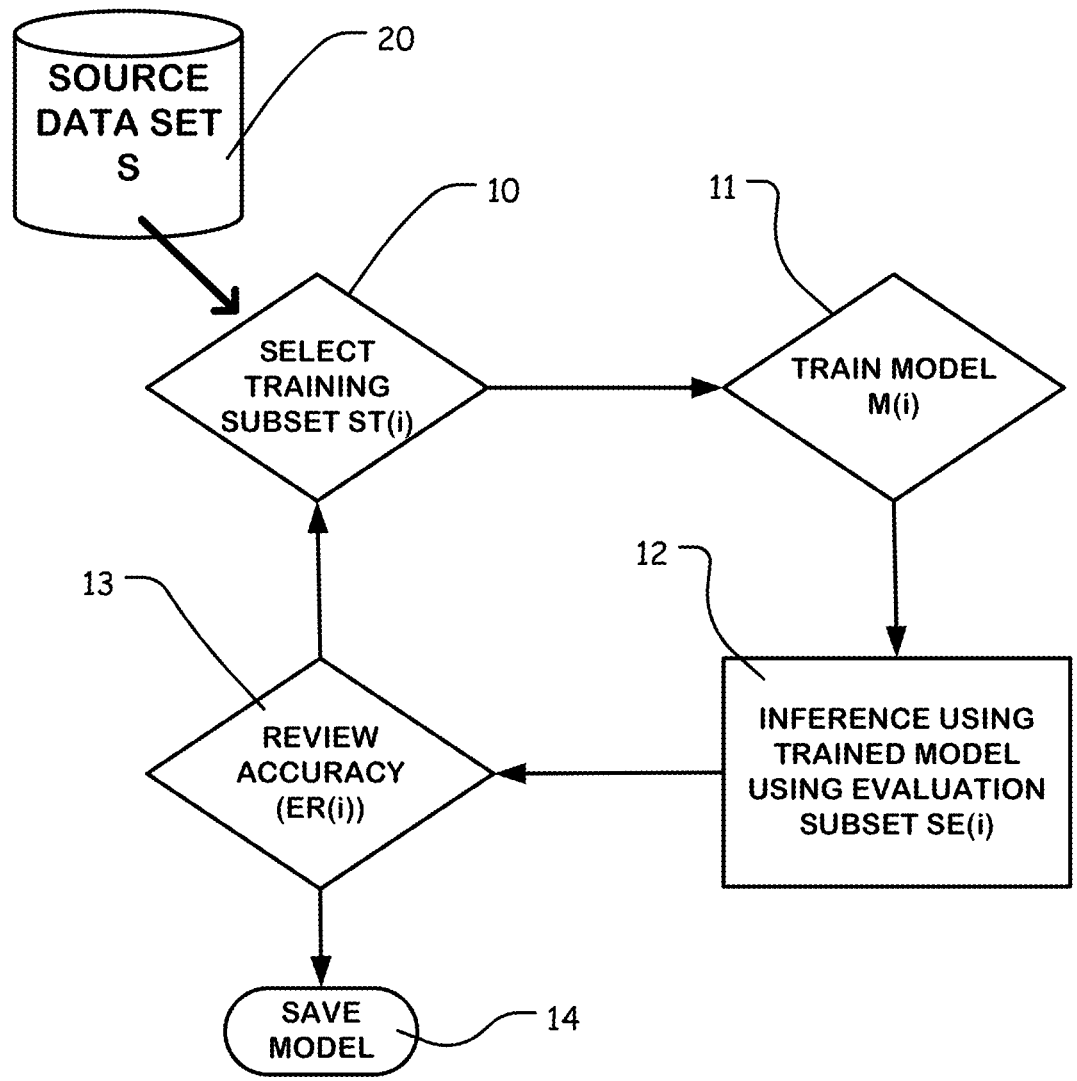
FIG. 1 is a simplified diagram of an iterative training algorithm as described herein.

FIG. 1 illustrates a processing loop (STIR loop) that enables relying on small training sources, in an iterative fashion that provides for learning from errors in each previous cycle.

In FIG. 1, a computer system has access to a database that stores a source data set S 20 of labeled training objects usable for training a classification engine. The loop begins by selecting a training subset ST(i) 10 from the data set S, which is substantially smaller than the entire data set S (20). Using the training subset ST(i) 10, the computer system trains a model M(i) 11 that comprises the parameters and coefficients used by the classification engine. Next, the model M(i) 11 is used by the inferencing engine to classify objects in an evaluation subset SE(i) 12 of the source data set S (20). The results of the inferencing based on model M(i) 11 are evaluated and an error subset ER(i) 13 of mistakenly classified objects in the evaluation subset SE(i) 12 is identified. The size and nature of the error subset ER(i) 13 can then be compared to predetermined parameters that can indicate the performance of the model M(i) 11 across the categories to be classified. If the model M(i) 11 satisfies the parameters, then it is saved for use in an inference engine in the field (14). If the model M(i) 11 does not satisfy the parameters, then the loop returns to select a training subset for the next cycle. The cycles are iteratively applied until the parameters are satisfied and a final model is developed.

Figure 2A:
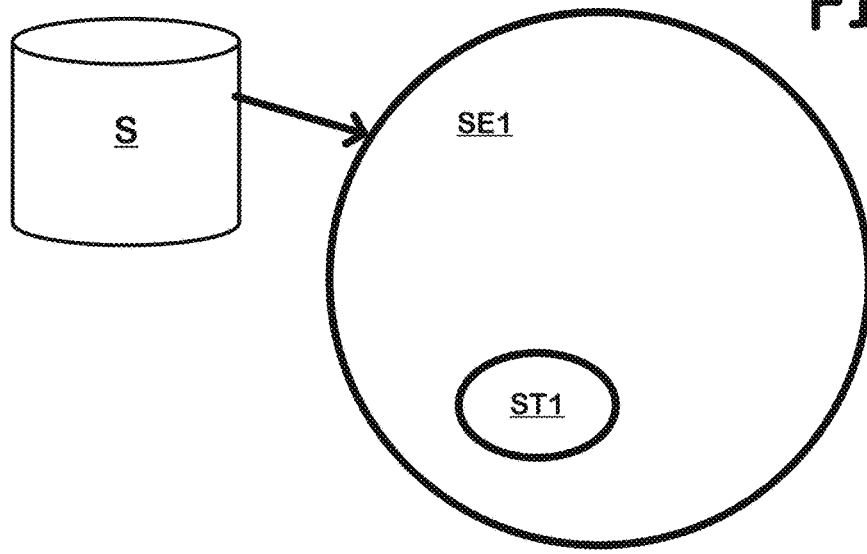
FIGS. 2A, 2B, 2C, 2D, 2E, 2F illustrate stages of an iterative training algorithm as described herein according to one embodiment.

FIGS. 2A to 2F illustrate stages of a training algorithm as described herein. In FIG. 2A, some of the source data set S is accessed to select a first training subset ST(1), and some of the source data set S, excluding the first training subset, is accessed for use as a first evaluation subset SE(1). The first training subset ST(1) can be 1% or less of the source data set S.

A model M(1) is generated using ST(1), and used to classify the objects in the first evaluation subset SE(1).

Figure 2B:
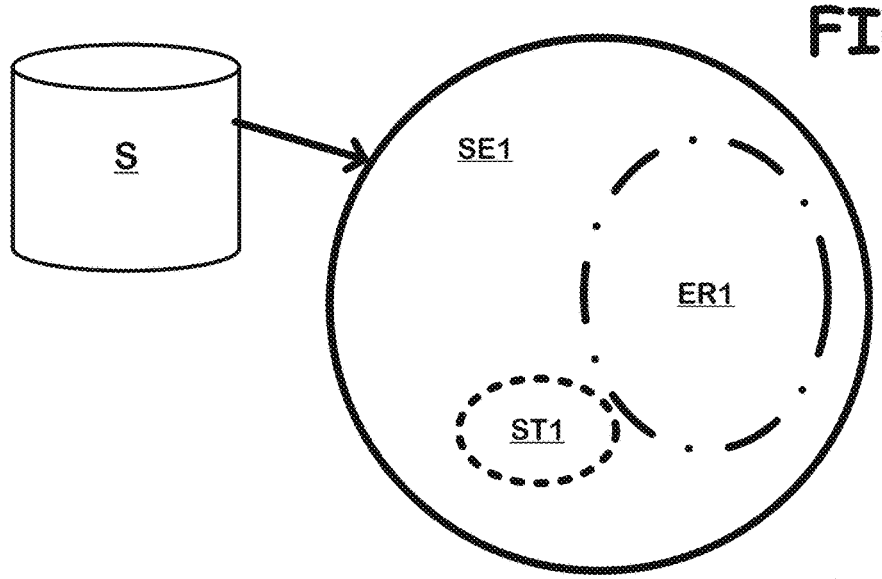

As shown in FIG. 2B, an error subset ER(1) is identified of objects in the first evaluation subset mistakenly classified using the model M(1).

Figure 2C:
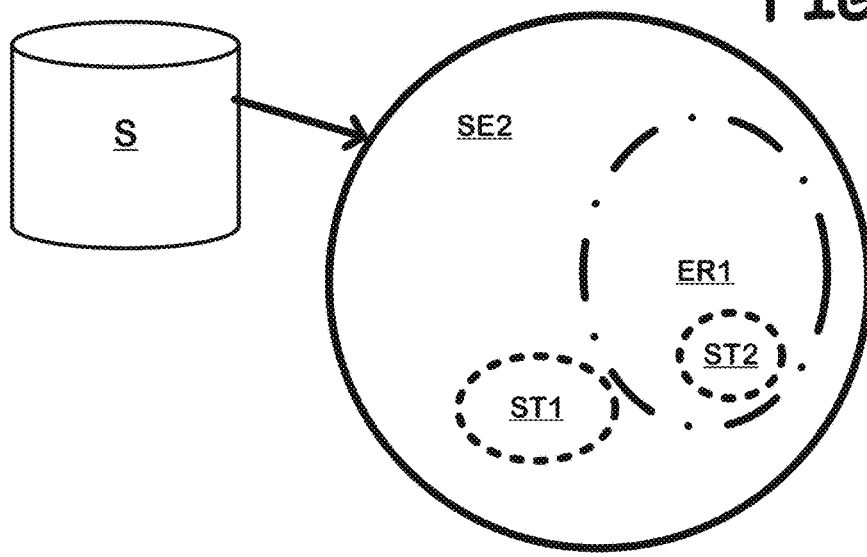

As shown in FIG. 2C, some of the error subset ER(1) is accessed for use as a second training subset ST(2). ST(2) can include some or all of the error subset ER(1).

A model M(2) is generated using ST(1) and ST(2), and used to classify the objects in the second evaluation subset SE(2), which excludes ST(1) and ST(2).

Figure 2D:
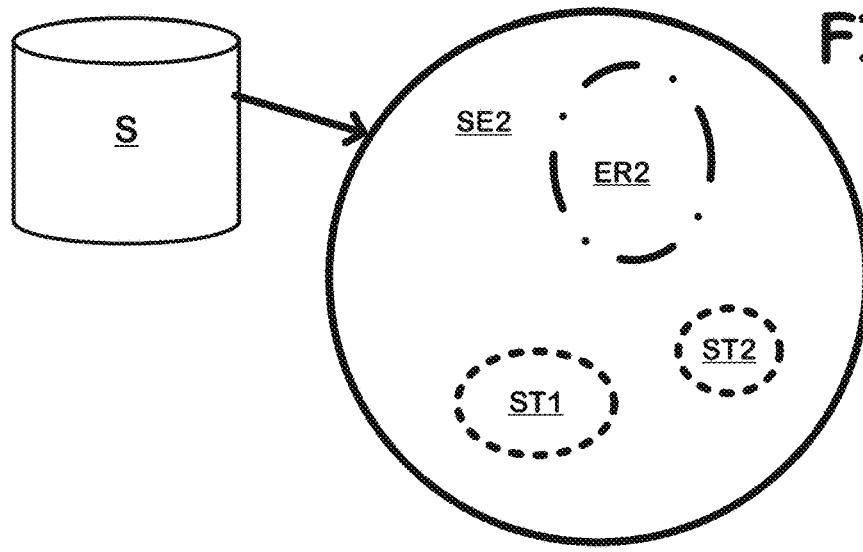

As shown in FIG. 2D, an error subset ER(2) is identified of objects in the second evaluation subset mistakenly classified using the model M(2). The training subset ST(i) for i=2, can include less than one half of the objects in the error subset ER(1).

Figure 2E:
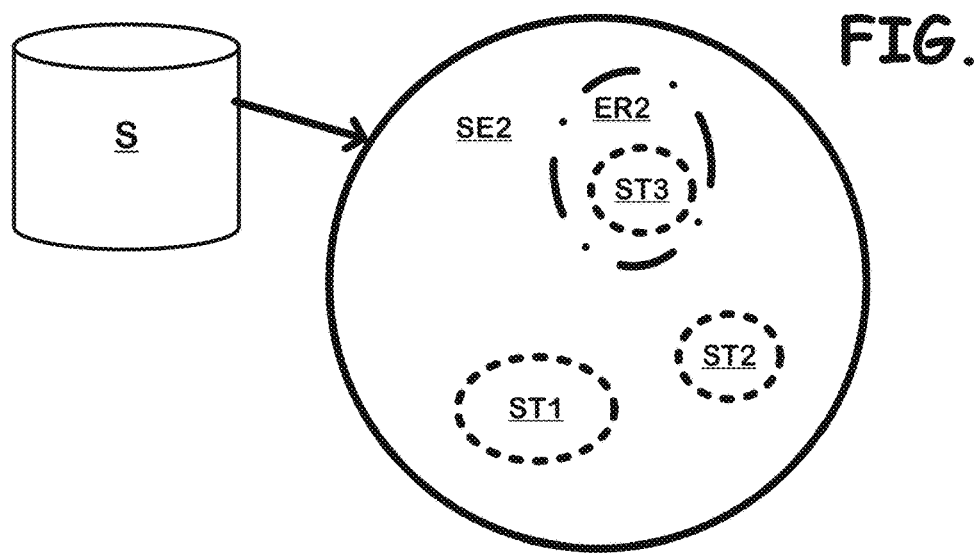

As shown in FIG. 2E, some of the error subset ER(2) is accessed for use as a third training subset ST(3). ST(3) can include some or all of the error subset ER(2).

A model M(3) is generated using ST(1), ST(2) and ST(3), and used to classify the objects in the third evaluation subset SE(3), which excludes ST(1), ST(2) and ST(3).

Figure 2F:
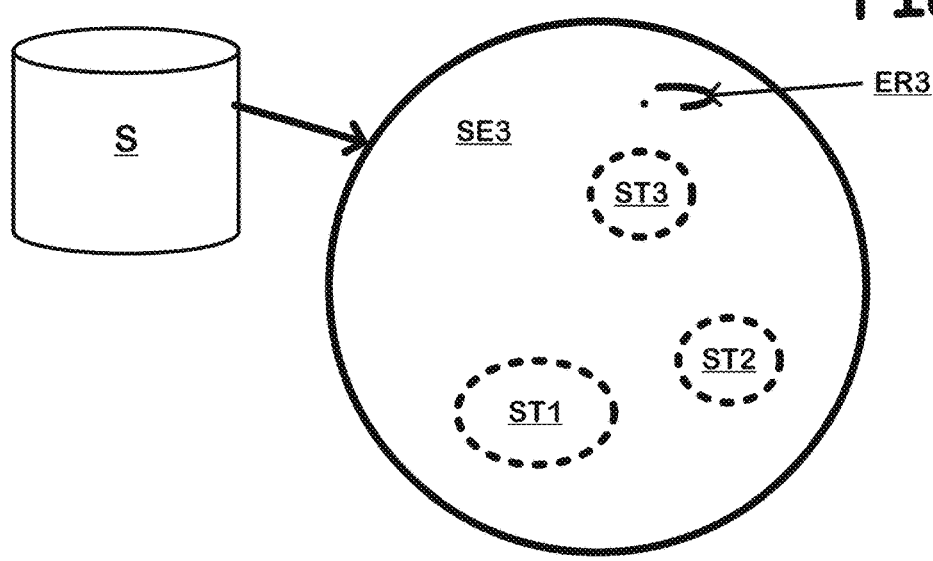

As shown in FIG. 2F, an error subset ER(3) is identified of objects in the third evaluation subset mistakenly classified using the model M(3). In this example, the error subset ER(3) is small, and the model M(3) is usable in the field. This procedure can be iteratively performed until the proportion of mistaken classifications reaches a satisfaction point, such as less than 10% or less than 1%, depending on the use of the trained model.

Figure 3:
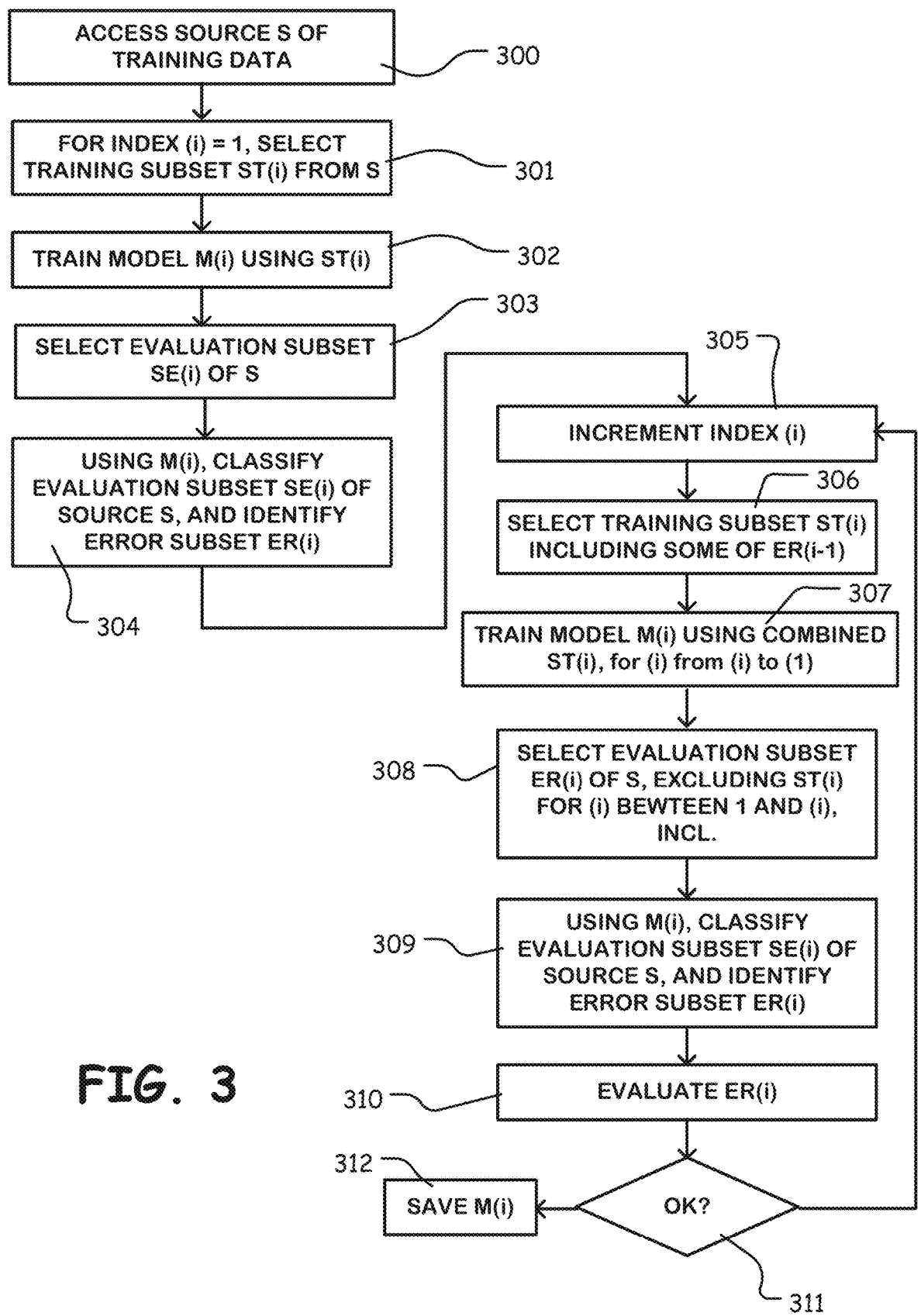
FIG. 3 is a flowchart illustrating an embodiment of an iterative training algorithm like that illustrated in FIGS. 2A to 2F.

FIG. 3 is a flowchart of a training algorithm like that illustrated with respect to FIGS. 2A to 2F, executable in a computer system.

The algorithm begins by accessing the source data set S of training data (300). For a first cycle with the index (i)=1, a training subset ST(1) is accessed from the set S (301). Using the training subset ST(1), a model M(1) of a classification engine is trained (302). Also, an evaluation subset SE(1) of the source data set S is accessed (303). Using the model M(1), the evaluation subset is classified and an error subset ER(1) is identified of objects in the evaluation subset that are mistakenly classified using model M(1) (304).

After the first cycle, the index (i) is incremented (305), and a next cycle of the iteration begins. The next cycle includes selecting a training subset ST(i) including some of the error subset ER(i−1) from the previous cycle (306). Also, model M(i) is trained using the combined ST(i) for (i) from 1 to (i), which includes the training subsets of the current cycle and all the previous cycles (307). An evaluation subset SE(i) for the current cycle is selected, excluding the training subsets of the current cycle and all the previous cycles (308). Using the model M(i), the evaluation subset SE(i) is classified, and the error subset ER(i) for the model M(i) of the current cycle is identified (309). The error subset ER(i) for the current cycle is evaluated against the expected parameters for a successful model (310). If the evaluation is satisfied (311), then the model M(i) for the current cycle is saved (312). If at step 311, the evaluation is not satisfied, then the algorithm loops back to increment the index (i) at step 305, and the cycle repeats until a final model is provided.

Figure 4A:
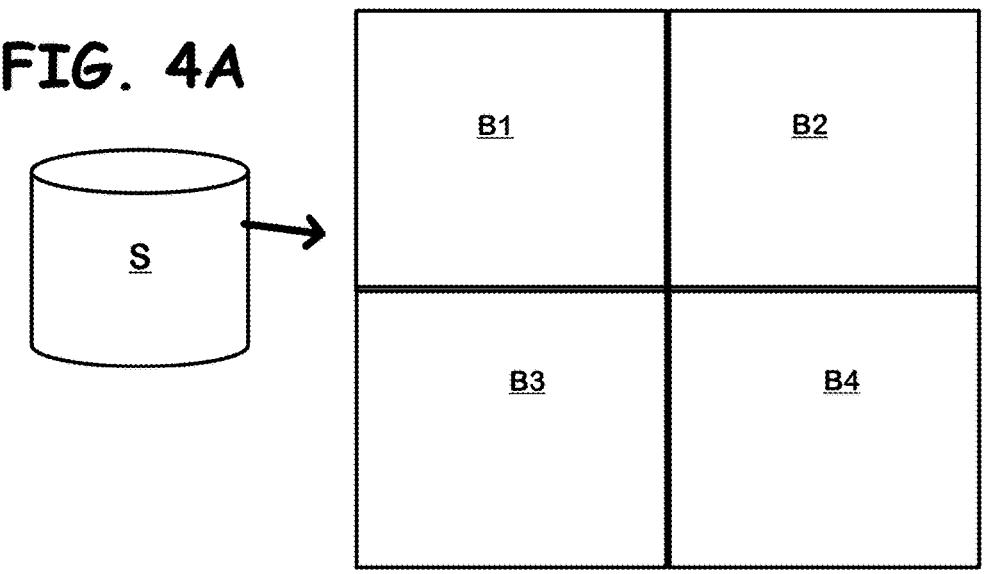
FIGS. 4A, 4B, 4C, 4D, 4E, 4F illustrate stages of an iterative training algorithm as described herein according to another embodiment.

FIGS. 4A to 4F illustrate an alternative procedure for training the classification engine including a step of partitioning the source data set. As illustrated in FIG. 4A, the source data set S is partitioned into blocks B1 to B4, which can be non-overlapping blocks B1 to B4 of objects in the source data set S. In one example, the source data set S may include 10000 defects in category C1 and 98 defects in category C2. The blocks can be selected in a way that maintains the relative numbers in the categories. So, for partitioning in the 10 blocks in this example, objects in each block can be selected to include about 10% of the defects in category C1 (about 100) and about 10% of the defects in category C2 (about 10). With uneven distributions, there is a possibility that model performance may degrade. For example, if one category of objects occurs for a short interval of time, and the objects in the training data set are partitioned simply by time intervals, then that category may be guttered undesirably, in one partition or two partitions.

Figure 4B:
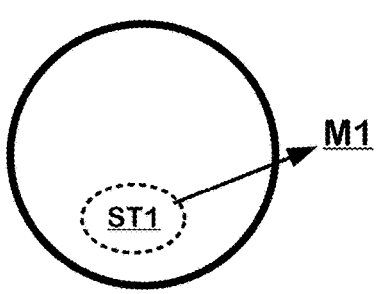

FIG. 4B illustrates that objects from the first block B1 are accessed to provide a first training subset ST1 which includes much less than all the objects in the first block. A model M1 is trained using the first training subset ST1. ST1 which can include only a small proportion of the training data set S, such as less than 1%.

Figure 4C:
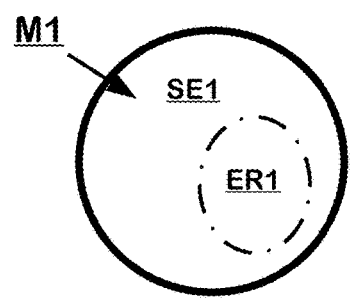

As illustrated in FIG. 4C, the first model M1 is applied over a first evaluation subset SE1 that includes some or all of the objects in the second block B2, and a first error subset ER1 of objects mistakenly classified by the first model M1 in the first evaluation subset SE1 is identified.

Figure 4D:
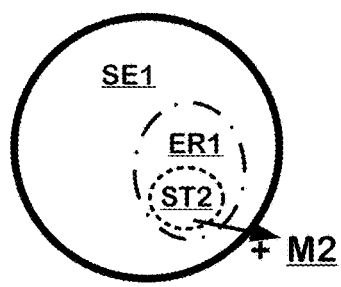

FIG. 4D illustrates that a second training subset ST2 is selected from objects in the first error subset ER1, and used in combination with the first training subset (indicated by the + on the arrow) to develop a model M2. ST2 can include some or all of the objects in ER1.

Figure 4E:
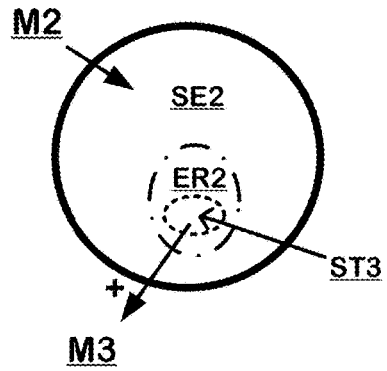

As seen in FIG. 4E, model M2 is applied to a second evaluation subset SE2 which includes some or all of the objects in the third block B3. A second error subset ER2 is identified of objects mistakenly classified by the second model M2 in the second evaluation subset SE2. Also, a third training subset ST3 is identified that includes some or all of the objects in the second error subset ER2. Using the first, second and third training subsets, a third model M3 is trained.

Figure 4F:
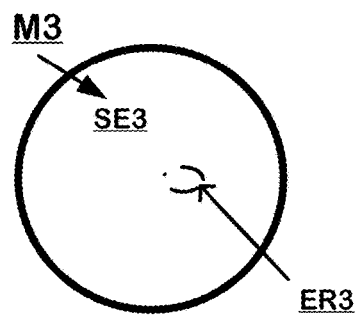

As illustrated in FIG. 4F, the third model M3 is applied to a third evaluation subset SE3 which includes some or all of the objects in the fourth block B4. A third error subset ER3 is identified that includes objects in the third evaluation subset SE3 which were mistakenly classified using the model M3. In this example, the third error subset ER3 is very small, indicating that the model M3 can be used as the final model.

Figure 5:
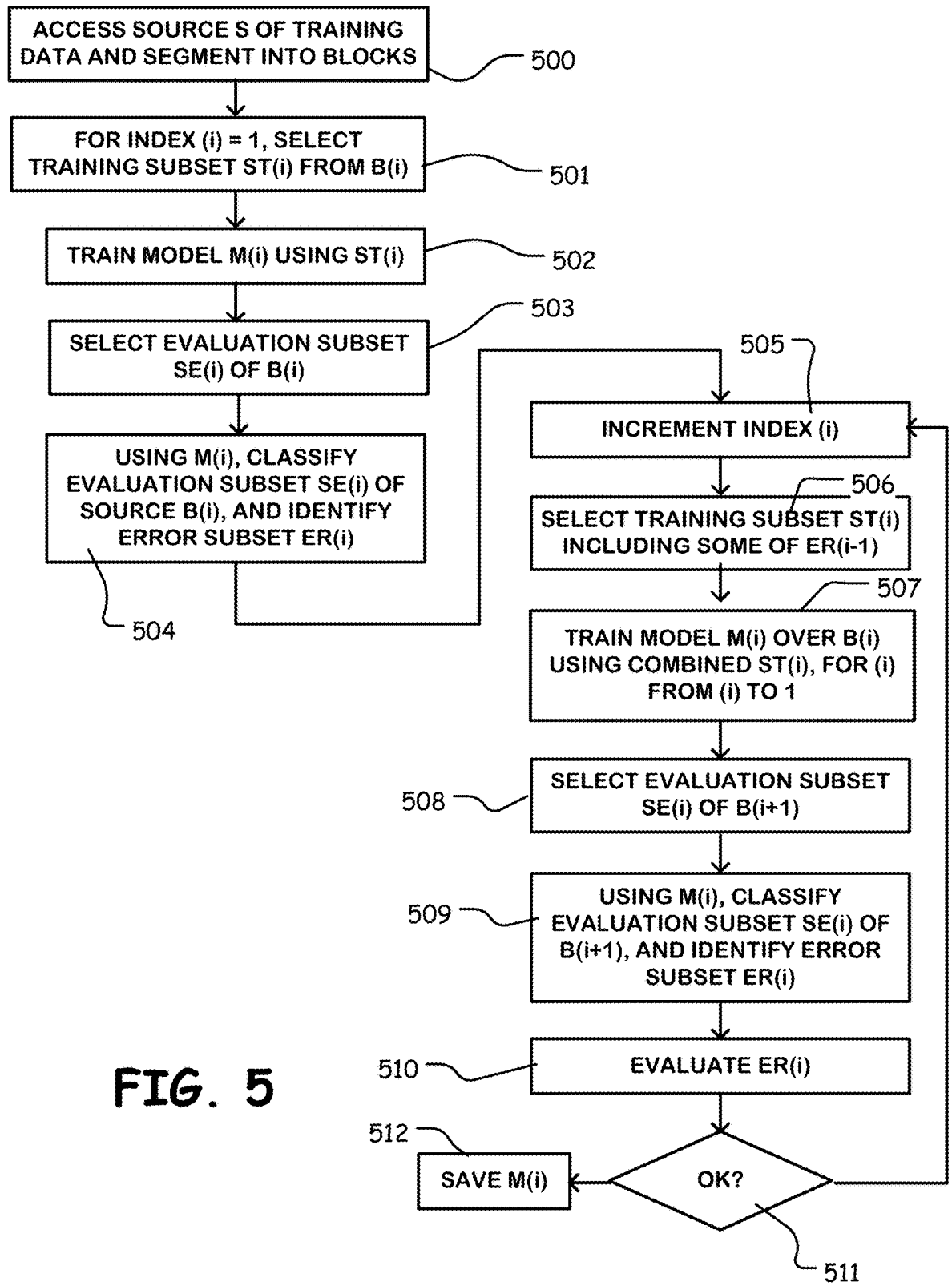
FIG. 5 is a flowchart illustrating another embodiment of an iterative training algorithm like that illustrated in FIGS. 4A to 4F.

FIG. 5 is a flowchart of a training algorithm like that illustrated with respect to FIGS. 4A to 4F, executable in a computer system.

The algorithm begins by accessing the source data set S of training data and segmenting it into non-overlapping blocks B(i) (500). For a first cycle with the index (i)=1, a training subset ST(1) is accessed including a small number of objects from the block B(i) (501). Using the training subset ST(1), a model M(1) of a classification engine is trained (502). Also, an evaluation subset SE(1) including some or all of the objects in block B2 from the source data set S is accessed (503). Using the model M(1), the evaluation subset SE(1) is classified and an error subset ER(1) is identified of objects in the evaluation subset SE(1) that are mistakenly classified using model M(1) (504).

After the first cycle, the index (i) is incremented (505), and a next cycle of the iteration begins. The next cycle includes selecting a training subset ST(i) including some of the error subset ER(i−1) from the previous cycle (506). Also, model M(i) is trained using the combined ST(i) for (i) from 1 to (i), which includes the training subsets of the current cycle and all the previous cycles (507). An evaluation subset SE(i) for the current cycle is selected, which includes some or all of the objects from the next block B(i+1), and excluding the training subsets of the current cycle and all the previous cycles (508). Using the model M(i), the evaluation subset SE(i) is classified, and the error subset ER(i) for the model M(i) of the current cycle is identified (509). The error subset ER(i) for the current cycle is evaluated against the expected parameters for a successful model (510). If the evaluation is satisfied (511), then the model M(i) for the current cycle is saved (512). If at step 511, the evaluation is not satisfied, then the algorithm loops back to increment the index (i) at step 505, and the cycle repeats until a final model is provided.

The initial training subset ST1 in both alternatives describe above, is chosen so that it is much smaller than the training data set S. For example, less than 1% of the training data set S may be used as the initial training subset ST1, to train the first model M1. This has the effect of improving the efficiency of the training procedures. The selection of the initial training subset can apply a random selection technique so that the distribution of objects in the categories in the training subset approximates the distribution in the source training data set S. However, in some cases, the training data set S can have a non-uniform distribution of objects in a number of categories. For example, over categories C1 to C9, the data set S may have a distribution of objects as follows:

C1: 125600
C2: 5680
C3: 4008
C4: 254
C5: 56
C6: 32
C7: 14
C8: 7
C9: 2

With this distribution, a training algorithm that uses a training subset with a similar distribution, may generate a model that performs well only for the first three categories C1, C2 and C3.

To improve performance, the initial training subset can be chosen in a distribution balancing process. For example, the method for selecting the initial training subset can set parameters for the categories to be trained. In one approach, the parameters can include a maximum number of objects in each category. In this approach the training subset can be limited to for example a maximum of 50 objects per category, so that the distribution above will limit categories C1 to C5 to 50 objects, while categories C6 to C9 are unchanged.

Another parameter can be a minimum number of objects per category, combined with the maximum discussed above. For example, if the minimum is set to 5, then categories C6 to C8 are included and category C9 is left out. This results in a training subset including 50 objects in categories C1 to C5, 32 objects in category C6, 14 objects in category C7 and 7 objects in category C8 for a total of 299 objects. Note that because the initial training subset ST1 is small, it is expected that the size of the error subset can be relatively large. For example, the accuracy of the model M1 may be about 60%. The training process needs additional training data to address the 40% mistaken classifications.

A procedure can be set to select the second training subset ST2, so that 50% of ST1>ST2>3% of ST1. Similarly, for the third training subset 50% of (ST1+ST2)>ST3>3% of (ST1+ST2), and so on until the final training subset STN, applying a range of relative sizes between 3% and 50%.

The range of relative sizes between 5% and 20% is recommended.

The objects in the additional training subsets ST2 to STN, can be chosen in multiple ways as well. In one example, the additional training subsets are selected using a random selection from the corresponding error subsets. In this random approach, the training subset has a size and a distribution that are functions of the size of, and the distribution of objects in, the error subset from which it is chosen. A risk of this approach is that some categories may have a very small signal in the training subsets.

In another approach, the objects are chosen in a category aware procedure. For example, the training subset can include a maximum number of objects in each category. For example, the maximum for a given cycle could be 20 objects per category, where categories having less than 20 are included in full.

In another approach, some objects can be chosen randomly, and some in a category aware procedure.

Figure 6:
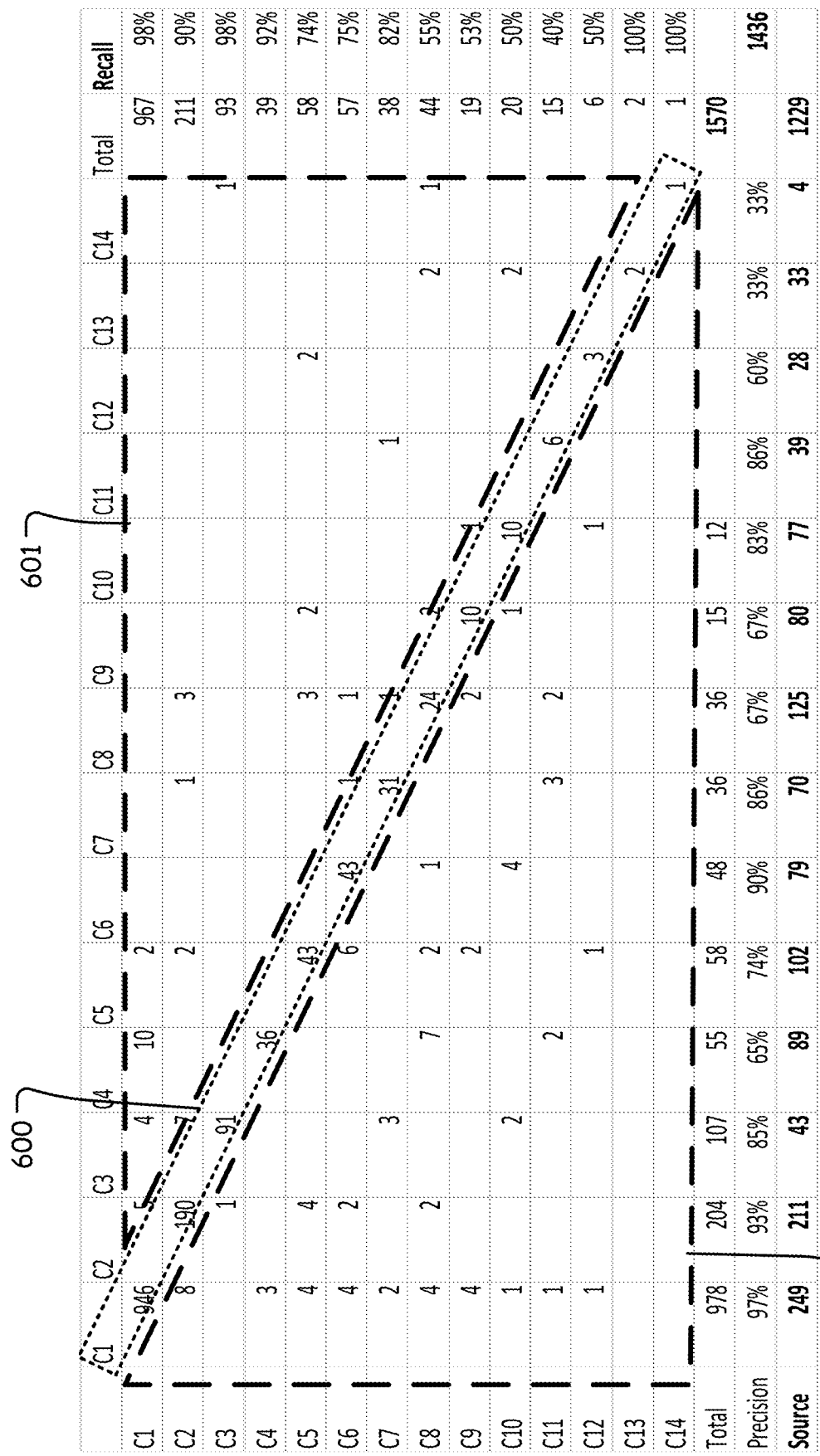
FIG. 6 includes a table illustrating classification of a training source, used for explanation of techniques for selecting training subsets after the first training subset.

FIG. 6 illustrates a graphic user interface which can be used in a computer system configured for training as described herein in each cycle to select the next training subset. In the interface, a table is displayed having rows that correspond to counts of ground truth classifications of objects categories C1 to C14, a row "Total" for a total count in the corresponding columns, a row "Precision" for a measure of precision of the inference engine which indicates a percentage of correct classifications over all categories, and a row "Source" for a count of objects in the training data source used to form the model used in the inference engine. The table has columns that correspond to numbers of objects classified by the inference engine using the model in the each of categories of objects, a column "Total" for a total count of objects in the corresponding rows, and a column "recall" which indicates the percentage of correct classifications for each category.

Thus, the column labeled C1 correctly classified 946 objects, and mistakenly classified 8 objects in C2 as C1, 3 objects in C4 as C1, 4 objects in C5 as C1, and so on. The row labeled C1 shows that 946 C1 objects were correctly classified, 5 C1 objects were classified as C2, 4 C1 objects were classified as C3, 10 C1 objects were classified as C4 and so on.

The diagonal region 600 includes the correct classifications. The regions 601 and 602 include the error subset.

The illustrated example shows result after several cycles, using a training source having 1229 classified objects from a combination of training subsets from multiple cycles as discussed above, to produce a model that makes 1436 correct classifications of 1570 objects in the evaluation subset. Thus, the error subset at this stage is relatively small (134 mistakes). In earlier cycles, the error subset can be larger.

To select a next training subset, the process can select a random combination of objects from the regions 601 and 602. So, to add about 5% more objects to the training subset of 1229 objects (62 objects), about half of the error subset (134/2=77 objects) can be identified as the next training subset to be combined with the training subsets from previous cycles. Of course, the numbers of objects can be selected with more precision if desired.

To select a next training subset using a category aware procedure, two alternative approaches are described.

First, if the goal of the model is to provide higher precision over all categories, then a number, for example 10, of objects in each column mistakenly classified can be included in the training subset, with classifications having less than 10 mistakenly classified objects to be kept in full. Here C10 will have 2 mistakenly classified objects in the column to be included in the training subset for the current cycle.

Second, if the goal of the model is to provide higher recall over a given category, then a number, for example 10 again, of objects in each row mistakenly classified, then a number for example 10 objects in each row mistakenly classified can be included in the training subset, with classifications having less than 10 mistakenly classified objects to be kept in full. Here C10 will have 10 mistakenly classified objects in the row to be included in the training subset for the current cycle.

In one approach, a random selection approach is applied for the first and perhaps other early cycles, a mixed approach is applied in the intermediate cycles, and the category aware approach is applied in the final cycles where the error subsets are small.

Figure 7A:
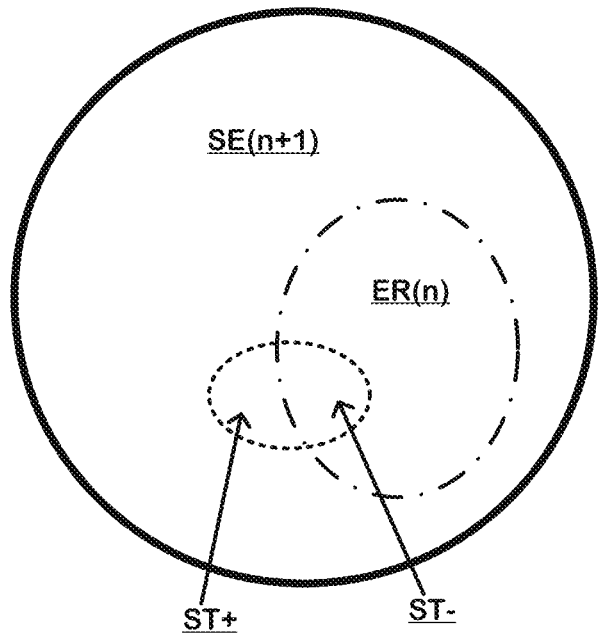
FIGS. 7A and 7B illustrates stages of iterative training algorithms as described herein according to an alternative technique for selecting training subsets.
Figure 7B:
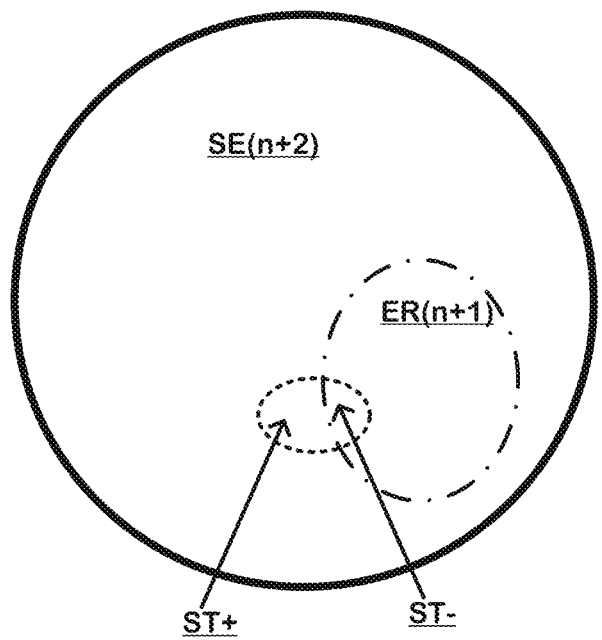

An approach as illustrated in FIGS. 7A and 7B can be applied in some embodiments. Referring to FIG. 6, there are very few objects in categories C11 to C14 in the example shown in the table. As a result, the model stability may be poor, particularly for classifications in these categories. Thus, in selecting the training subset for a given cycle, objects that were correctly classified (true positives) can be added into the training subset. For example, in order to reach the target number of 10 objects, this approach could add three true positive objects classified in category C12 to the training subset, two true positive objects classified in category C13 to the training subset, and one true positive object classified in the category C14 to the training subset.

FIG. 7A illustrates selection of a training subset ST(n+1) selected from an error subset ER(n) generated using model M(n) in an evaluation subset SE(n+1), using some objects (ST−) from the error subset ER(n) and some correctly classified objects (ST+) from the evaluation subset SE(n+1). FIG. 7B illustrates objects used in a next cycle to select training subset ST(n+2) from an error subset ER(n+1) generated using model M(n+1) in an evaluation subset SE(n+2), using some objects (ST−) from the error subset ER(n+1) and some correctly classified objects (ST+) from the evaluation subset SE(n+2).

Images of defects on integrated circuit assemblies taken in a manufacturing assembly line can be classified in many categories. These defects vary significantly in counts for a given manufacturing process, and so the training data has an uneven distribution, and includes large data sizes. An embodiment of the technology described herein can be used to train an ANN to recognize and classify these defects, improving the manufacturing process.

There are several types of defect, and the defects having similar shapes can arise from different defect sources. For example, a portion of a pattern missing in one category if defect image may appear to arise from an issue with a previous or underlying layer. For example, problems like embedded defects or a hole-like crack may have existed in the layer below the current layer. But the pattern missing in an image in a different category seems like a problem arising in the current layer. It is desirable to build one neural network model which can classify all type of defects.

We need to monitor in-line process defects to evaluate the stability and quality of in-line products, or the life of manufactured tools.

Figure 8:
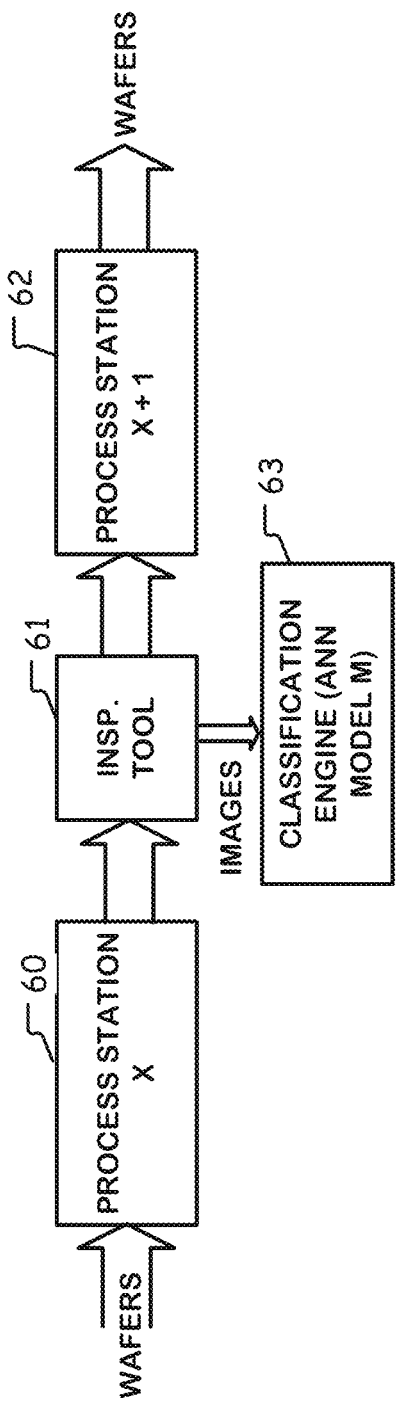
FIG. 8 is a simplified diagram of an integrated circuit manufacturing process utilizing a classification engine trained as described herein.

FIG. 8 is a simplified diagram of a manufacturing assembly line including process station 60, image sensor 61 and process station 62. In the manufacturing line, integrated circuit wafers are input to process station X, and subject to a process such as deposition or etching, and output to an image sensor 61. From the image sensor the wafers are input to process station X+1, where they are subject to a process such as deposition, etching or packaging. Then, the wafers are output to a next stage. The images from the image sensor are supplied to a classification engine that includes an ANN trained according to the technology described herein, which identifies and classifies defects in the wafers. The classification engine may receive images for other stages in the manufacturing process as well. This information about defects in the wafers sensed at the inspection tools 61, including image sensors, can be applied to improve the manufacturing process, such as by adjusting the process executed at process station X or in other stations.

Figure 9:
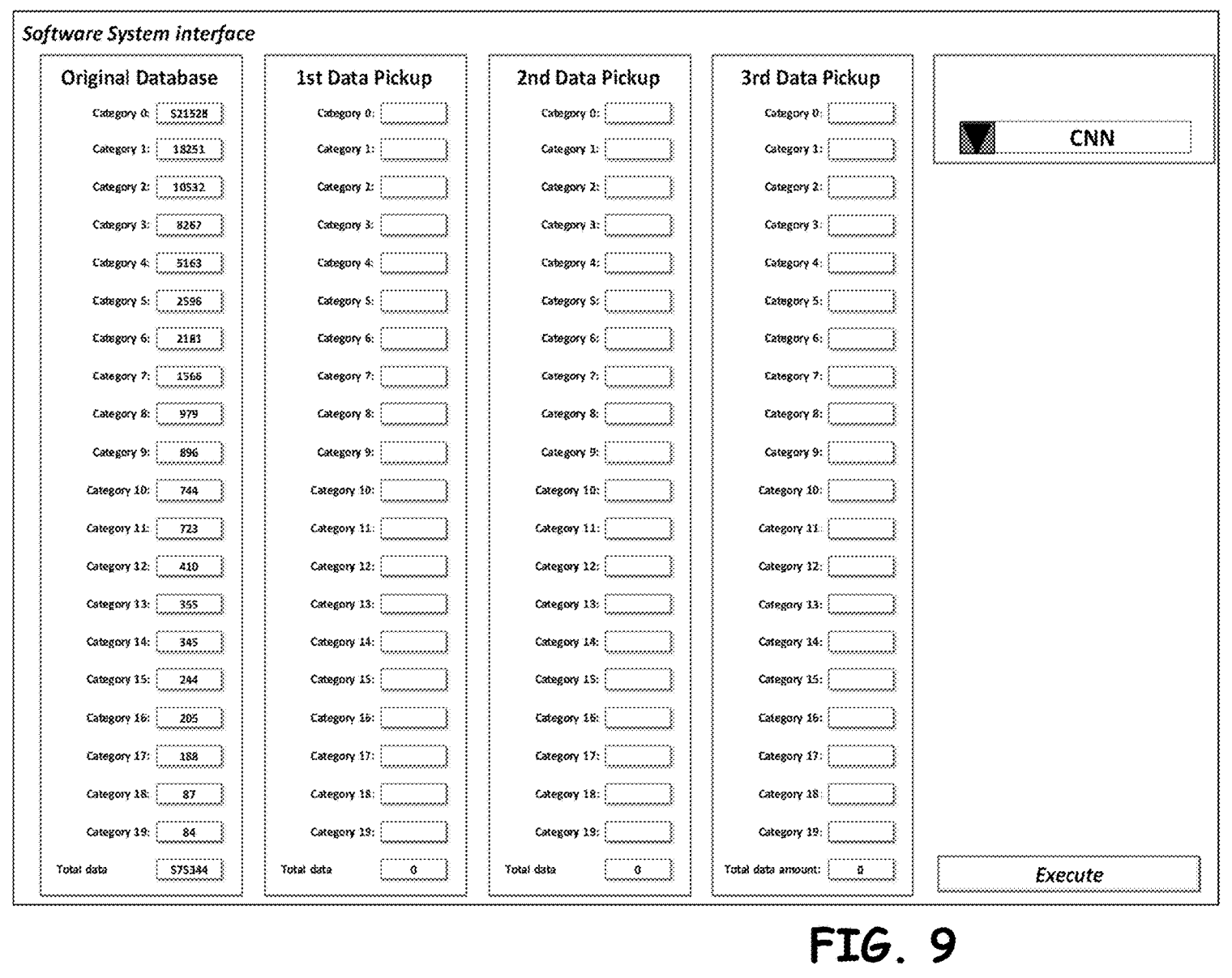
Figure 10:
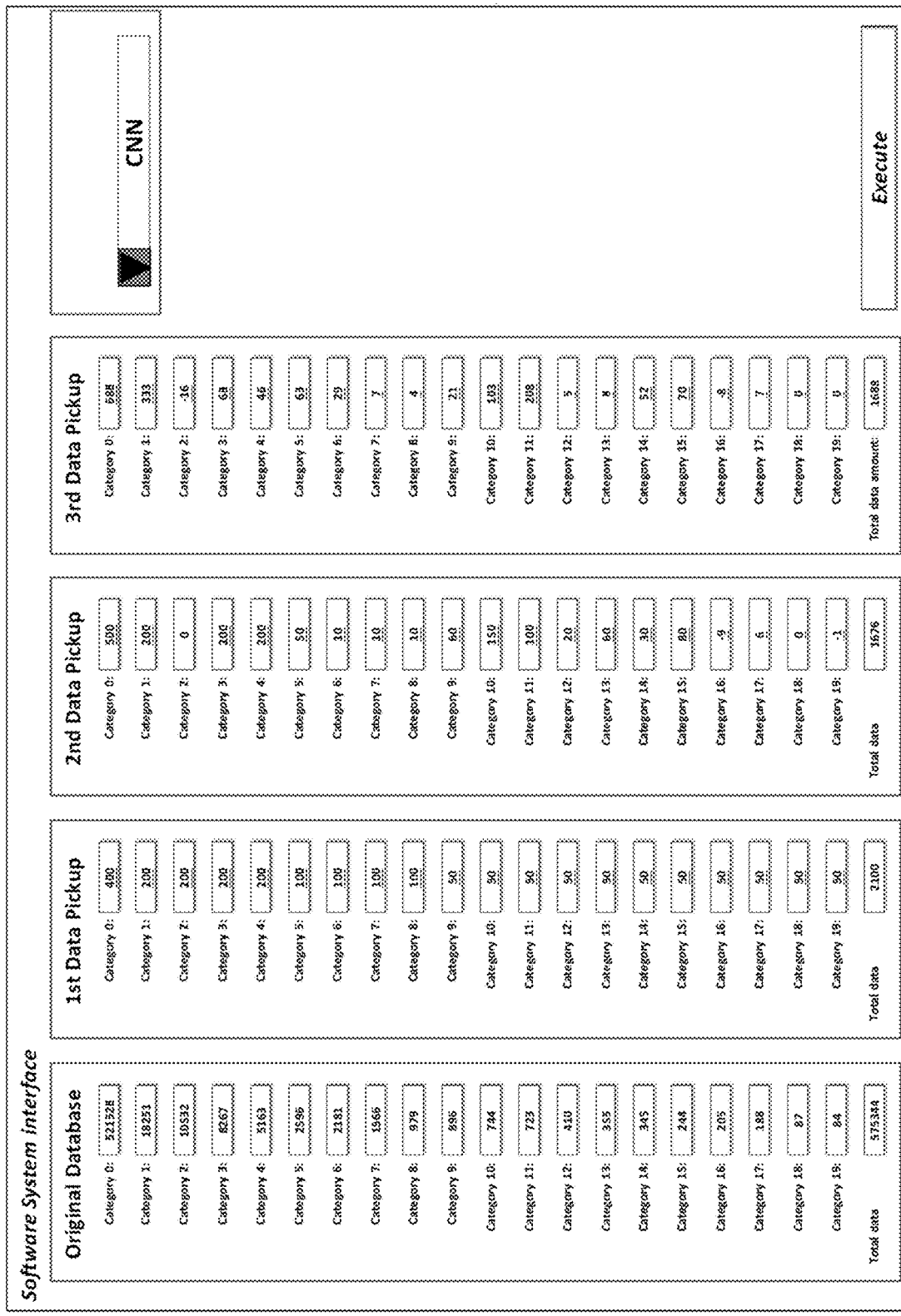
FIG. 10 is an image of the graphical user interface of the computer system executed by a system configured to execute a training procedure as described herein, at subsequent stages.

FIGS. 9 and 10 illustrate a graphical user interface executed by a computer system that is configured to execute training procedures as described herein. In FIG. 9, five blocks on a graphical user interface are shown. The block labeled Original Database can include a list of categories and numbers of objects in each category. This block can be automatically populated by the interface driver by analysis of the training data set S. The second block (1st Data Pickup) includes fields associated with each category, which can be populated by user input directly, or in response to parameters to be applied to the corresponding error subset, to set the numbers of objects to be used in the first training subset ST1 for each category. The third block (2nd Data Pickup) includes fields associated with each category, which can be populated by user input directly, or in response to parameters to be applied to the corresponding error subset, to set the numbers of objects to be used in the second training subset ST2 for each category. The fourth block (3rd Data Pickup) includes fields associated with each category, which can be populated by user input directly, or in response to parameters to be applied to the corresponding error subset, to set the numbers of objects to be used in the third training subset ST3 for each category. The fifth block (Please select computing model) includes a pull down menu for selection of the ANN architecture for which the model is to be trained, showing here one example named "CNN." The graphical user interface also includes a button widget labeled "Execute", which when selected cause the procedure to be executed using the parameter provided using the interface.

FIG. 10 illustrates the graphical user interface of FIG. 9, in which the contents of the second to fourth blocks are filled, corresponding in this example to the training data used in succeeding cycles, including combinations of training subsets ST1, ST2 and ST3.

A number of flowcharts illustrating logic executed by a computer configured to execute training procedures are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

As used herein, a subset of a set excludes the degenerate cases of a null subset and a subset that includes all members of the set.

Figure 11:
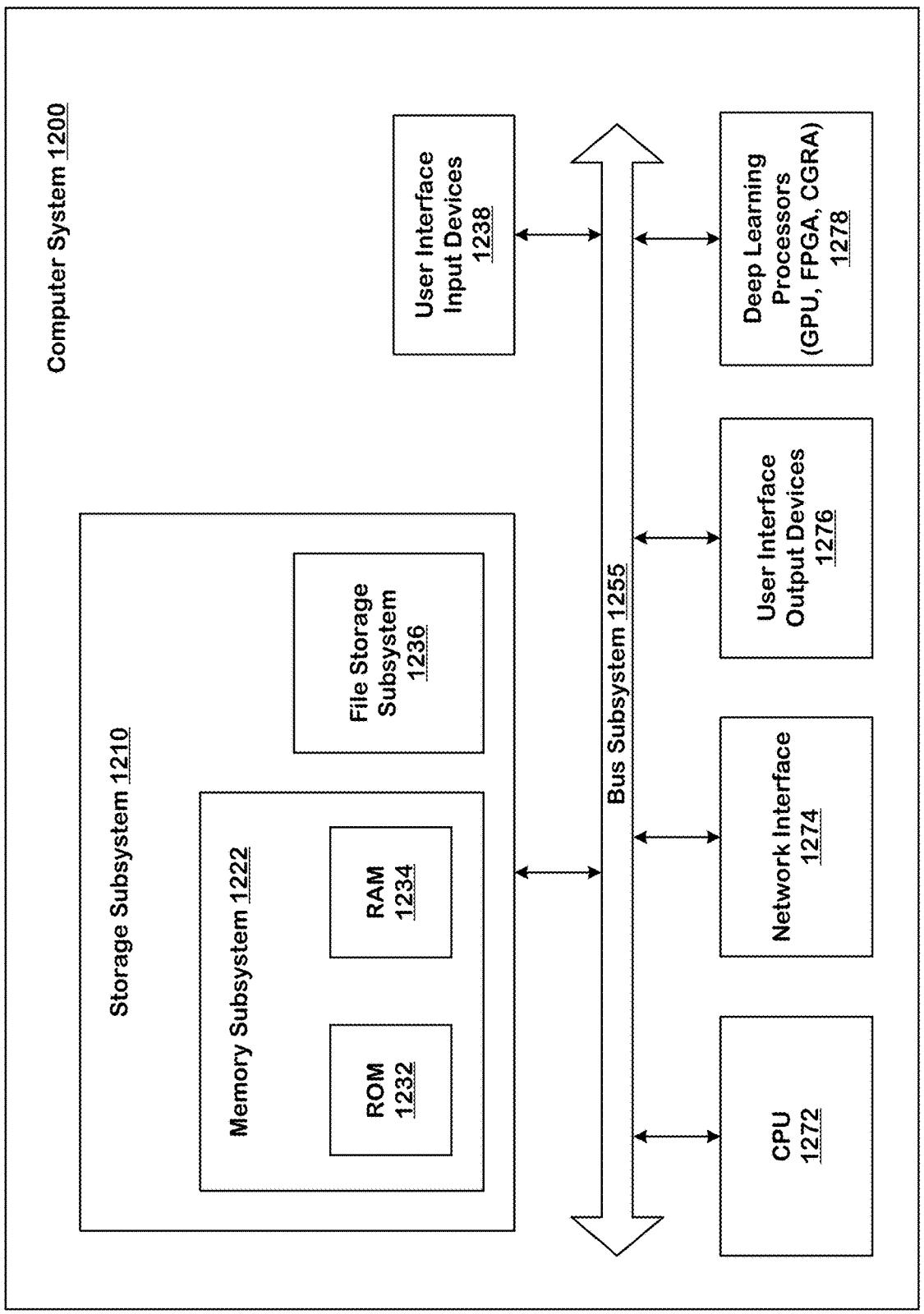
FIG. 11 is a simplified block diagram of a computer system configured to execute a training procedure as described herein.

FIG. 11 is a simplified block diagram of a computer system 1200, one or more of which in a network can be programmed to implement the technology disclosed. Computer system 1200 includes one or more central processing units (CPU) 1272 that communicate with a number of peripheral devices via bus subsystem 1255. These peripheral devices can include a storage subsystem 1210 including, for example, memory devices and a file storage subsystem 1236, user interface input devices 1238, user interface output devices 1276, and a network interface subsystem 1274. The input and output devices allow user interaction with computer system 1200. Network interface subsystem 1274 provides an interface to outside networks, including an interface to corresponding interface devices in other computer systems.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1210 stores programming and data constructs that provide the functionality of some or all of the modules and methods described herein to train models for ANNs. These models are generally applied to ANNs executed by deep learning processors 1278.

In one implementation, the neural networks are implemented using deep learning processors 1278 which can be configurable and reconfigurable processors, field-programmable gate arrays (FPGAs), application-specific integrated circuits (ASICs), and/or coarse-grained reconfigurable architectures (CGRAs) and graphics processing units (GPUs) other configured devices. Deep learning processors 1278 can be hosted by a deep learning cloud platform such as Google Cloud Platform™, Xilinx™, and Cirrascale™. Examples of deep learning processors 14978 include Google's Tensor Processing Unit (TPU)™, rackmount solutions like GX4 Rackmount Series™, GX149 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1222 used in the storage subsystem 1210 can include a number of memories including a main random access memory (RAM) 1234 for storage of instructions and data during program execution and a read only memory (ROM) 1232 in which fixed instructions are stored. A file storage subsystem 1236 can provide persistent storage for program and data files, including the program and data files described with reference to FIGS. 1, 3 and 5, and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1210, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 11 is intended only as a specific example for purposes of illustrating the preferred implementations of the present invention. Many other configurations of computer system 1200 are possible having more or less components than the computer system depicted in FIG. 11.

Embodiments of the technology described herein include computer programs stored on non-transitory computer readable media deployed as memory accessible and readable by computers, including for example, the program and data files described with reference to FIGS. 1, 3 and 5.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for generating a classification model to classify objects in a plurality of categories using a training data set S of objects, using one or more programmed computers:
   for an index i=1, accessing a first training subset ST(i) including some of the objects in the training data set S;
   training a first model M(i) using the first training subset ST(i);
   using the first model M(i) to classify a first evaluation subset SE(i) of the training data set S excluding the first training subset ST(i), and identifying a first error subset ER(i) of objects in the first evaluation subset SE(i) classified erroneously;
   (a) incrementing the index i, and accessing another training subset ST(i) including some of the objects in error subset ER(i−1);
   (b) training a model M(i) using a combination of the training subsets ST(i), for i between 1 and i inclusive;
   (c) using the model M(i) to classify an evaluation subset SE(i) of the training data set S excluding the training subsets ST(i), for i between 1 and i inclusive, and identifying an error subset ER(i) of objects in the evaluation subset SE(i) classified erroneously; and
   (d) evaluating the error subset ER(i) to estimate performance of the model M(i), and if performance is satisfactory, save model M(i), and if performance is not satisfactory, then repeat steps (a) to (d): and
   wherein accessing another training subset ST(i), for i>1, including some of the objects in the error subset ER(i−1) includes, for a given category in the plurality of categories, having less than a minimum number M of objects classified erroneously in the error subset, adding objects from one or more of the error subset or error subsets ER(i), for i=to i−2 to 1, to establish the minimum number M in the given category in the training subset.

2. The method of claim 1, wherein said evaluating includes determining a number of objects erroneously classified, and comparing the number to a threshold.

3. The method of claim 1, wherein said evaluating includes determining a number of objects erroneously classified in the error subset ER(i), and comparing the number with a number of objects erroneously classified in previous error subset ER(i−1).

4. The method of claim 1, wherein the first training subset ST(i) where i=1, includes 10% or less, of the objects in the training data set S.

5. The method of claim 1, wherein the first training subset ST(i) where i=1 includes 1% or less, of the objects in the training data set S.

6. The method of claim 1, wherein the training subset ST(i) for i=2, includes less than one half of the objects in the error subset ER(1).

7. The method of claim 1, including segmenting the training data set S into a plurality of blocks of training data, and wherein said first training subset ST(1) is accessed from a first block of the plurality of blocks, and the first evaluation subset includes some or all of a second block of the plurality of blocks, and excludes the first block.

8. The method of claim 7, wherein the first and second blocks have uniform sizes.

9. The method of claim 1, including segmenting the training data set S into a plurality of blocks of training data having uniform sizes, and wherein the training subset ST(i) for a given value of i, is accessed from a different block in the plurality of blocks than the evaluation subset SE(i) for the given value of i.

10. The method of claim 9, including determining a distribution of objects over the plurality of categories in the training set, and said training set is segmented so that some or all of the blocks in the plurality of blocks have the determined distribution.

11. The method of claim 1, including:
    accessing a database including objects classified according to the plurality of categories; and
    filtering the database as a function of the plurality of categories to produce the training set S.

12. The method of claim 11, wherein said filtering includes setting a maximum limit on a number of objects classified in a given category accessed for inclusion in the training set S.

13. The method of claim 12, wherein said filtering includes setting a minimum limit on a number of objects classified in a given category accessed for inclusion in the training set S.

14. The method of claim 1, wherein the training subset ST(i), for I=1, has a number N1 of objects, and the training subset ST(i), for i=2, has a number N2 of objects, and the number N2 is between 50% and 3% of the number N1.

15. The method of claim 14, wherein the number N2 is between 20% and 5% of the number N1.

16. The method of claim 1, wherein the combined training subsets ST(i), for i between 1 and A−1 inclusive, have a number NA of objects; and the training subset ST(i), for i=A, has a number NB of objects, and the number NB is between 50% and 3% of the number NA.

17. The method of claim 16, wherein the number NB is between 20% and 5% of the number NA.

18. The method of claim 1, wherein accessing another training subset ST(i), for i>1, including some of the objects in the error subset ER(i−1) includes accessing a target number of the objects in the error subset ER(i−1) without regard to categories for inclusion in the training sub set.

19. The method of claim 1, wherein accessing another training subset ST(i), for i>1, including some of the objects in the error subset ER(i−1) includes accessing objects so that for each category in the plurality of categories no more than a maximum number M of objects classified erroneously for each category are included in the training subset.

20. The method of claim 1, wherein accessing another training subset ST(i), for i>1, including some of the objects in the error subset ER(i−1) includes accessing objects so that for each category in the plurality of categories at least a minimum number M of objects classified erroneously for each category are included in the training subset.

21. The method of claim 1, wherein accessing another training subset ST(i), for i>1, including some of the objects in the error subset ER(i−1) includes accessing a part of a target number of the objects in the error subset ER(i−1) without regard to categories, and accessing a balance of the target number so that for each category no more than a maximum number M of objects classified erroneously for each category are included in the balances of the target number, and including said part and said balance in the training subset.

22. The method of claim 1, wherein the objects in the training set include images of defects on integrated circuit assemblies sensed in an integrated circuit fabrication process, the defects including a plurality of categories of defects.

23. The method of claim 22, including applying the saved model M(i) in an inference engine to detect and classify defects in an integrated circuit fabrication process.

24. The method of claim 1, including executing a user interface providing interactive tools to display information about categories of objects in the training data set S, to set parameters for configuring the training data set S, and to set parameters for accessing the training subsets ST(i), for i between 1 and i inclusive, from error subsets ER(i), for i between 1 and i inclusive.

25. The method of claim 24, wherein the user interface provides interactive tools to display information about categories of objects in the training subsets ST(i), for i between 1 and i inclusive, and about objects in error subsets ER(i), for i between 1 and i inclusive.

26. A computer system, comprising:

one or more processors including or having access to memory storing a classification engine trained according to the method of claim 1.

27. A computer program product comprising:

non-transitory computer readable memory, storing a computer program including logic to execute a procedure for generating a classification model to classify objects in a plurality of categories using a training data set S of objects, the procedure including:

for an index i=1, accessing a first training subset ST(i) including some of the objects in the training data set S;

training a first model M(i) using the first training subset ST(i);

using the first model M(i) to classify a first evaluation subset SE(i) of the training data set S excluding the first training subset ST(i), and identifying a first error subset ER(i) of objects in the first evaluation subset SE(i) classified erroneously;

(a) incrementing the index i, and accessing another training subset ST(i) including some of the objects in error subset ER(i−1);

(b) training a model M(i) using a combination of the training subsets ST(i), for i between 1 and i inclusive;

(c) using the model M(i) to classify an evaluation subset SE(i) of the training data set S excluding the training subsets ST(i), for i between 1 and i inclusive, and identifying an error subset ER(i) of objects in the evaluation subset SE(i) classified erroneously; and (d) evaluating the error subset ER(i) to estimate performance of the model M(i), and if performance is satisfactory, save model M(i), and if performance is not satisfactory, then repeat steps (a) to (d); and wherein accessing another training subset ST(i), for i>1, including some of the objects in the error subset ER(i−1) includes, for a given category in the plurality of categories, having less than a minimum number M of objects classified erroneously in the error subset, adding objects from one or more of the error subset or error subsets ER(i), for i=to i−2 to 1, to establish the minimum number M in the given category in the training subset.

* * * * *